US006524476B1

(12) United States Patent
Caiozza

(10) Patent No.: US 6,524,476 B1

(45) Date of Patent: Feb. 25, 2003

(54) OIL PAN CONTAINING A MAGNETIC FILTER APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 0 days.

(21) Appl. No.: 09/702,399

(22) Filed: Oct. 31, 2000

(51) Int. Cl.[7] ............................ B03C 1/08; B01D 35/06

(52) U.S. Cl. ........................ 210/222; 210/168; 184/6.23

(58) Field of Search ................................ 210/222, 223, 210/695, 168; 184/6.25; 335/302, 304, 305

(56) References Cited

U.S. PATENT DOCUMENTS

| | | | | | |
|---|---|---|---|---|---|
| 3,800,914 | A | * | 4/1974 | Miyata | 184/6.25 |
| 5,314,625 | A | * | 5/1994 | Farnelli | 184/6.25 |
| 5,510,024 | A | * | 4/1996 | Caiozza | 210/186 |
| 5,588,502 | A | * | 12/1996 | Bedi et al. | 141/98 |
| 5,702,598 | A | * | 12/1997 | Lemon et al. | 210/223 |

* cited by examiner

*Primary Examiner*—David A. Reifsnyder

(57) ABSTRACT

An oil pan containing a magnetic filter apparatus includes an oil pan member which includes a magnet assembly reception channel. A magnetic filter assembly is received in the magnet assembly reception channel, and attachment means are provided for attaching the magnetic filter assembly to the oil pan member. An oil flow director assembly is connected to an oil pump intake tube of an oil pump for directing oil flow to a high magnetic flux region of the magnetic filter assembly. The magnetic filter assembly separates ferro-magnetic particles from oil in the oil pan member and traps the separated particles on the magnetic filter assembly. The magnetic filter assembly includes a magnet support member which is attachable to the attachment means. A magnet unit is supported by the magnet support member. The magnet unit provides a high magnetic flux region to circulating oil in the vicinity of an oil pump intake tube for trapping metal particles on the magnetic filter assembly. The magnetic filter assembly includes handle portions which can be grasped for turning the magnetic filter assembly. The magnet support member includes a support connector portion for connecting to the attachment means. A support riser portion is connected to the support connector portion, and a magnet holding member is connected to the support riser portion. The support connector portion includes external threads for engaging complimentary internal threads of the attachment means.

5 Claims, 4 Drawing Sheets

OIL PAN CONTAINING A MAGNETIC FILTER APPARATUS

BACKGROUND OF THE INVENTION

1. Field of the Invention

The present invention relates generally to oil filter devices and, more particularly, to oil filter devices mounted on motor vehicles.

2. Description of the Prior Art

The use of oil filtering devices for motor vehicles is known in the prior art. In my prior patent U.S. Pat. No. 5,510,024 there is disclosed a magnet assembly or attachment for magnetically collecting metallic particles within an oil filter. That inventive device includes a pair of magnets supported in a spaced relationship by a carrier which latter is positionable along an exterior of a filter cartridge. The carrier serves the an additional function of a heat sink. A shunt couples opposite poles of the magnets together to increase the magnetic flux directed into the filter cartridge to separate and retain metallic particles from the filtered fluid.

An oil lubrication circuit of a motor vehicle includes a variety of components, two of which are an oil pan and an oil pump that includes an oil intake pipe. Oil flows from the oil pan into the oil intake pipe. It is conceived by the present inventor that it would be desirable to apply magnetic treatment of the circulating oil in the vicinity of the oil intake pipe of the oil pump.

To optimize the application of magnetic fields to the vicinity of the oil intake pipe, it would be desirable to provide an element which directs the flow of oil to a prepositioned gap between the oil intake pipe and a magnetic assembly.

In addition to providing a reservoir for oil, an oil pan covers the oil intake pipe. In this respect, it would be desirable if an oil pan were provided that is combined with a magnet assembly that is positioned near the oil intake pipe.

In view of the above considerations, the present inventor discloses herein an oil pan containing a magnetic filter apparatus. Yet, still other features would be desirable in such an oil pan containing a magnetic filter apparatus. For example, it would be desirable if the magnet assembly could easily be removed from the oil pan for cleaning and replaced in the oil pan after being cleaned.

Thus, while the foregoing body of prior art indicates it to be well known to use a magnet assembly for aiding in the filtration of oil in a motor vehicle, the prior art described above does not teach or suggest an oil pan containing a magnetic filter apparatus which has the following combination of desirable features: (1) magnetically treats circulating oil in the vicinity of the oil intake pipe of the oil pump; (2) provides an element which directs the flow of oil to a prepositioned gap between an oil intake pipe and a magnetic assembly; (3) combines an oil pan with a magnet assembly that is positioned near the oil intake pipe; and (4) provides a magnet assembly that can easily be removed from the oil pan for cleaning and replaced in the oil pan after being cleaned. The foregoing desired characteristics are provided by the unique oil pan containing a magnetic filter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an oil pan containing a magnetic filter apparatus which includes an oil pan member which includes a magnet assembly reception channel. A magnetic filter assembly is received in the magnet assembly reception channel, and attachment means are provided for attaching the magnetic filter assembly to the oil pan member. An oil flow director assembly is connected to an oil pump intake tube of an oil pump for directing oil flow to a high magnetic flux region of the magnetic filter assembly. The magnetic filter assembly separates ferromagnetic particles from oil in the oil pan member and traps the separated particles on the magnetic filter assembly.

The magnetic filter assembly includes a magnet support member which is attachable to the attachment means. A magnet unit is supported by the magnet support member. The magnet unit provides a high magnetic flux region to circulating oil in the vicinity of an oil pump intake tube for trapping metal particles on the magnetic filter assembly. The magnetic filter assembly includes handle portions which can be grasped for turning the magnetic filter assembly.

The magnet support member includes a support connector portion for connecting to the attachment means. A support riser portion is connected to the support connector portion, and a magnet holding member is connected to the support riser portion. The support connector portion includes external threads for engaging complimentary internal threads of the attachment means.

The attachment means includes a sealing ring placed on an inside surface of the oil pan member encompassing the magnet assembly reception channel. A second attachment ring is placed on top of the sealing ring. A first attachment ring is placed on an outside surface of the oil pan member encompassing the magnet assembly reception channel. Fasteners connect the first attachment ring to the second attachment ring, with the sealing ring and a portion of the oil pan member sandwiched therebetween.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved oil pan containing a magnetic filter apparatus which has all of the advantages of the prior art and none of the disadvantages.

It is another object of the present invention to provide a new and improved oil pan containing a magnetic filter apparatus which may be easily and efficiently manufactured and marketed.

It is a further object of the present invention to provide a new and improved oil pan containing a magnetic filter apparatus which is of durable and reliable construction.

An even further object of the present invention is to provide a new and improved oil pan containing a magnetic filter apparatus which is susceptible of a low cost of manufacture with regard to both materials and labor, and which accordingly is then susceptible of low prices of sale to the consuming public, thereby making such oil pan containing a magnetic filter apparatus available to the buying public.

Still yet a further object of the present invention is to provide a new and improved oil pan containing a magnetic filter apparatus which magnetically treats circulating oil in the vicinity of the oil intake pipe of the oil pump.

Still another object of the present invention is to provide a new and improved oil pan containing a magnetic filter apparatus that provides an element which directs the flow of oil to a prepositioned gap between an oil intake pipe and a magnetic assembly.

Yet another object of the present invention is to provide a new and improved oil pan containing a magnetic filter apparatus which combines an oil pan with a magnet assembly that is positioned near the oil intake pipe.

Even another object of the present invention is to provide a new and improved oil pan containing a magnetic filter apparatus that provides a magnet assembly that can easily be removed from the oil pan for cleaning and replaced in the oil pan after being cleaned.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved oil pan containing a magnetic filter apparatus embodying the principles and concepts of the present invention will be described.

Figure 1:
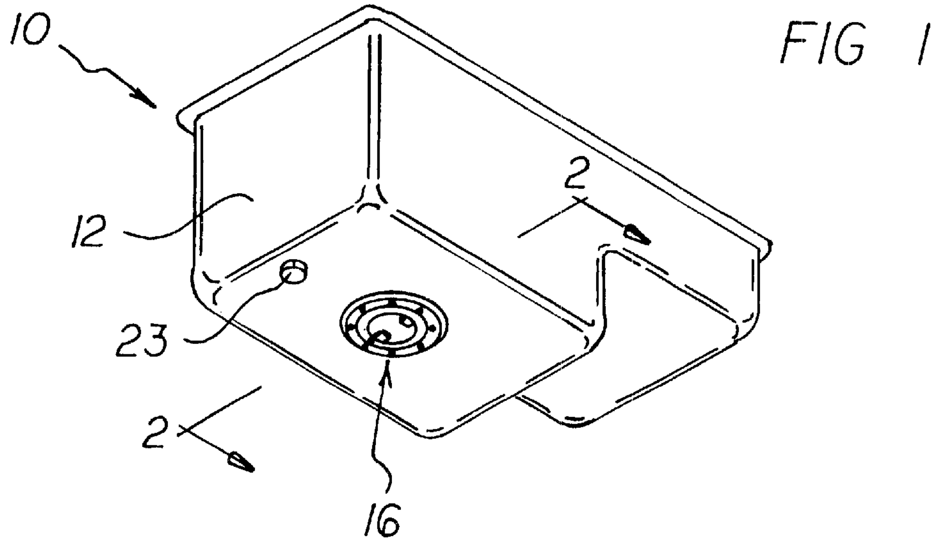
FIG. 1 is a perspective view showing a preferred embodiment of the oil pan containing a magnetic filter apparatus of the invention.
Figure 2:
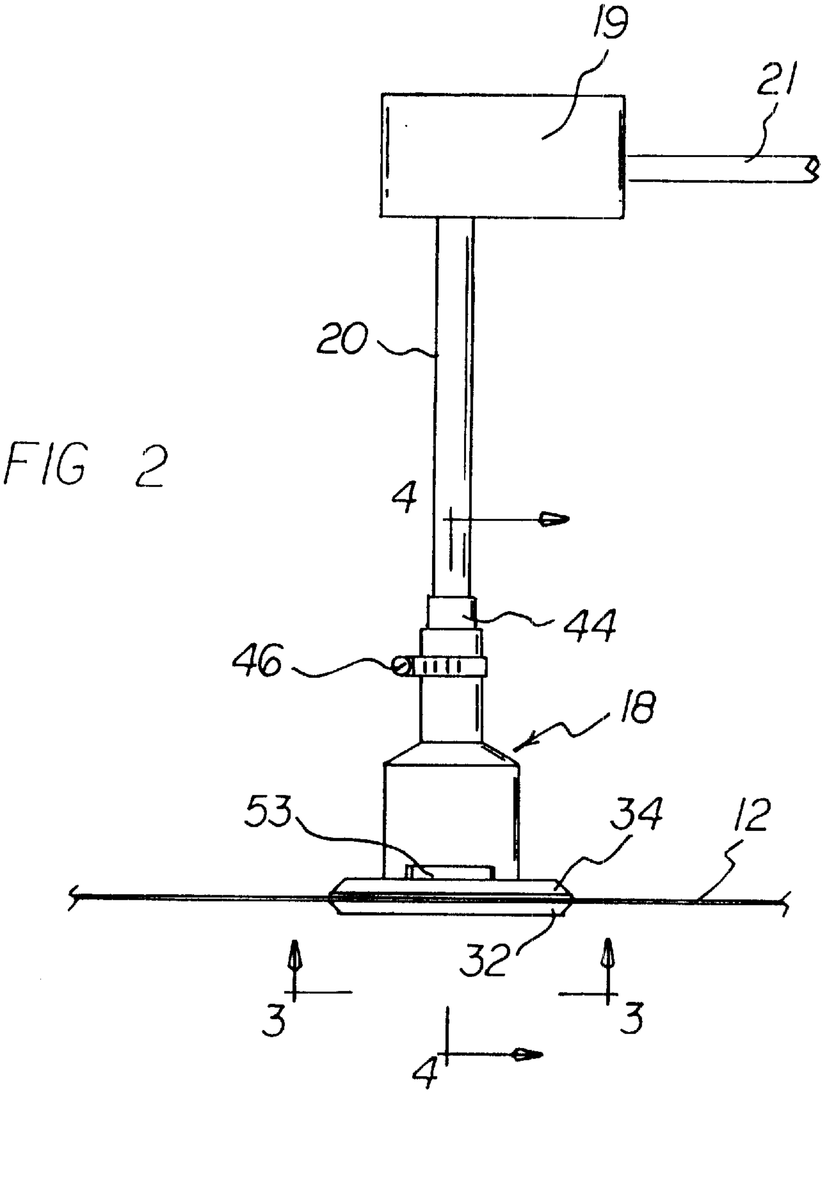
FIG. 2 is an enlarged cross-sectional view of the embodiment of the oil pan containing a magnetic filter apparatus shown in FIG. 1 taken along line 2—2 of FIG. 1.
Figure 3:
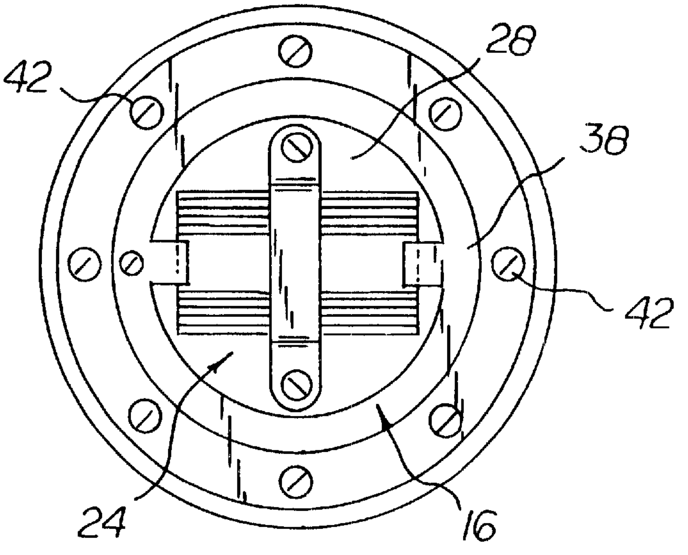
FIG. 3 is an enlarged bottom view of the embodiment of the oil pan containing a magnetic filter apparatus of FIG. 2 taken along line 3—3 thereof.
Figure 4:
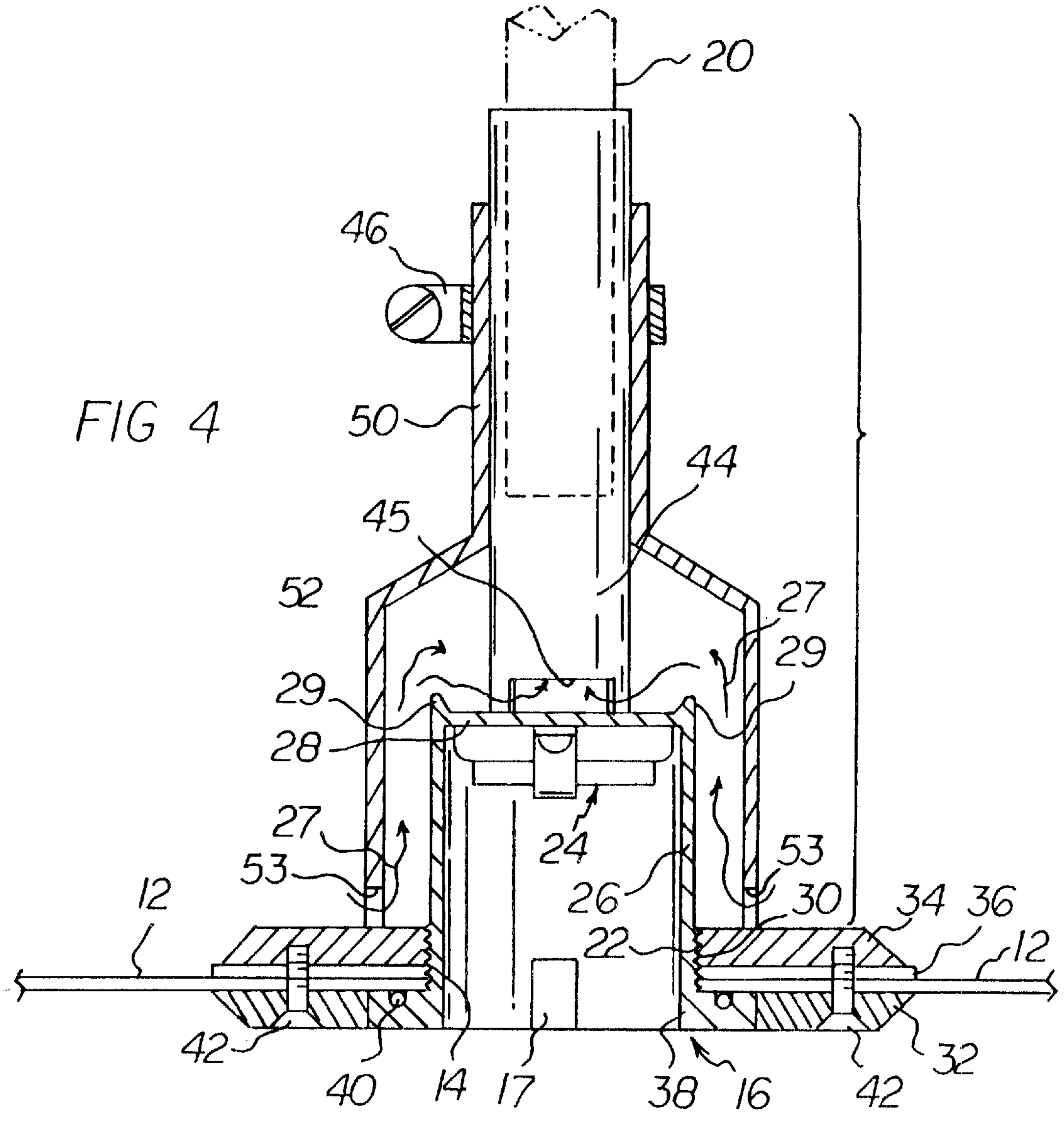
FIG. 4 is an enlarged cross-sectional view of the embodiment of the invention shown in FIG. 2 taken along line 4—4 thereof.
Figure 5:
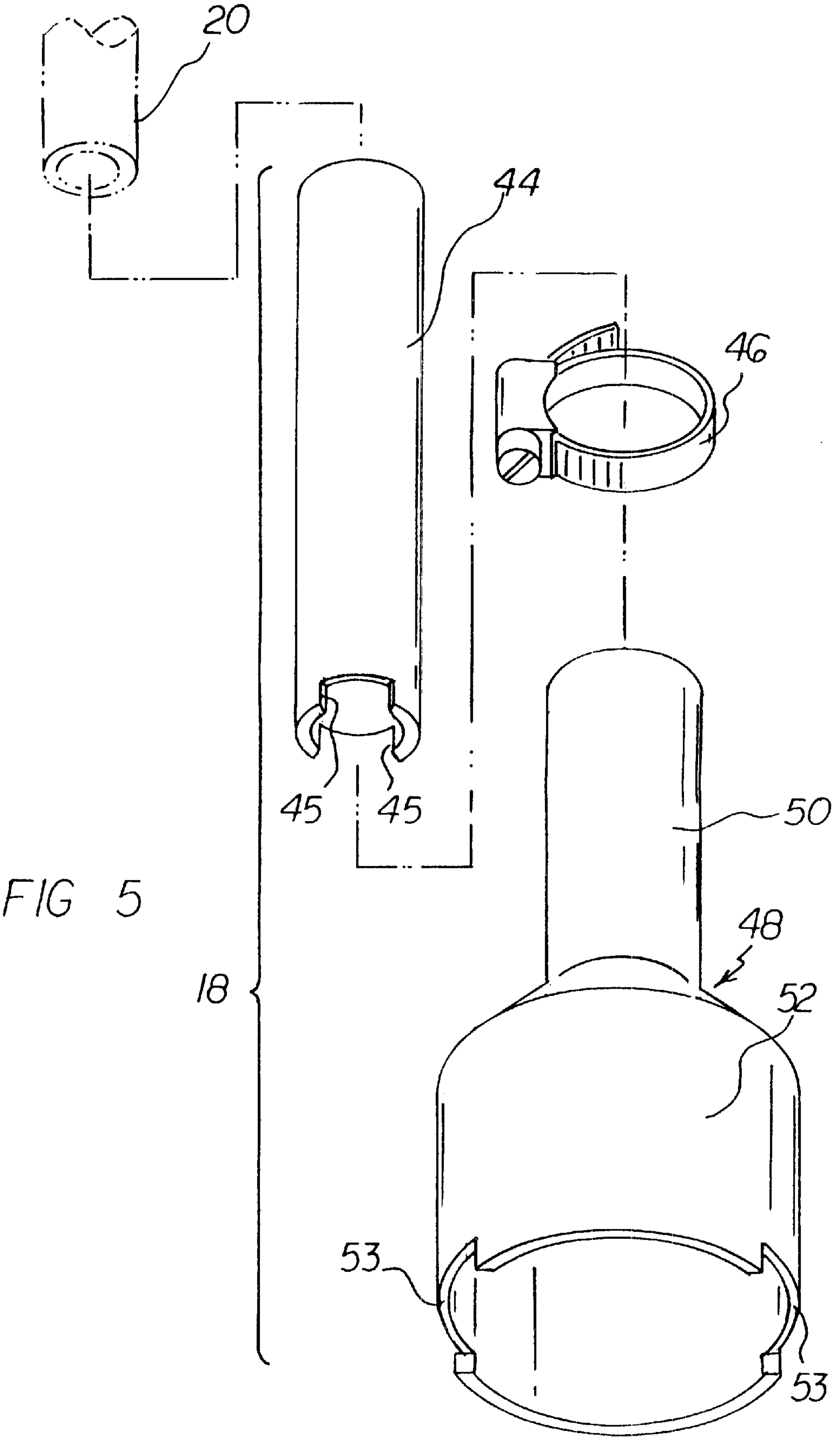
FIG. 5 is an exploded perspective view of oil flow directing elements of the embodiment of the invention shown in FIGS. 2 and 5.
Figure 6:
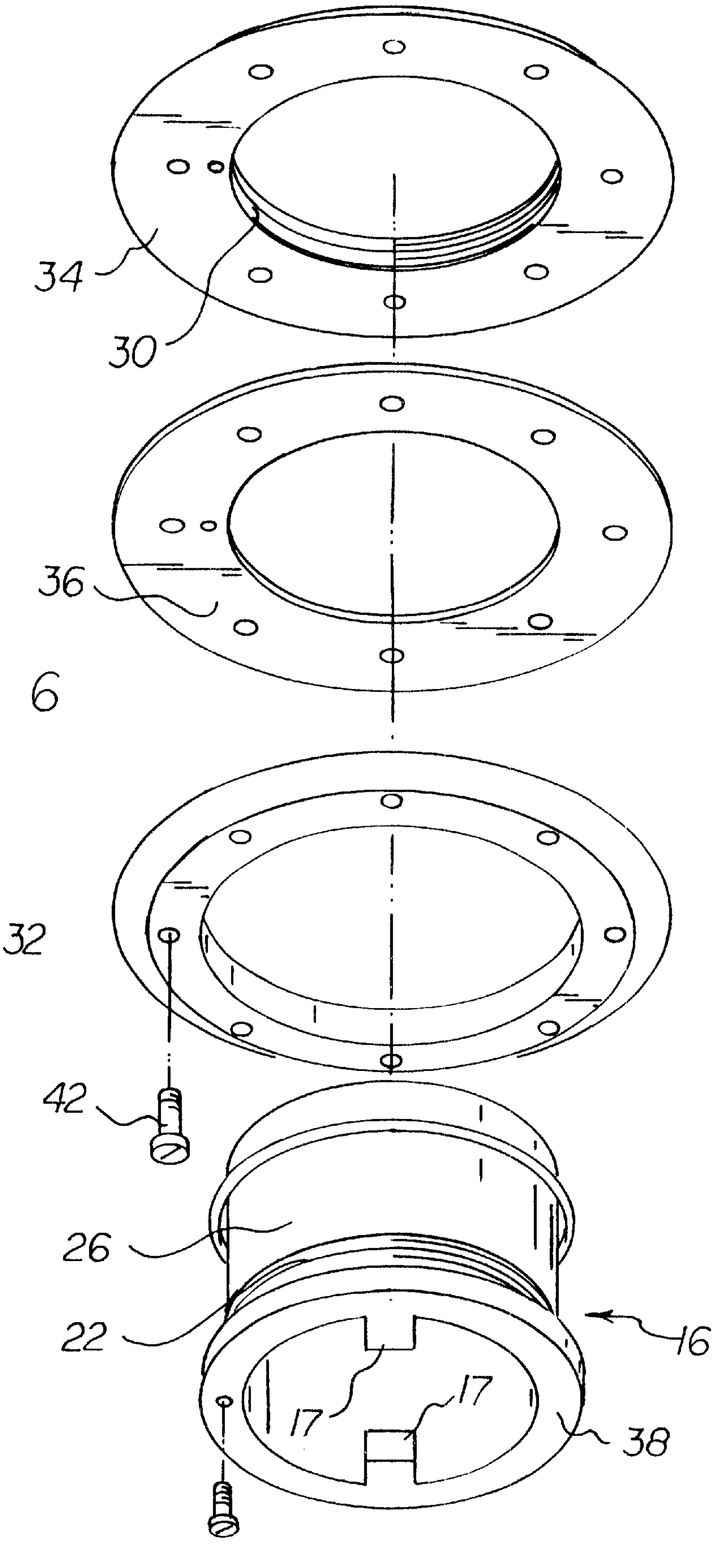
FIG. 6 is an exploded perspective view of elements of the embodiment of the invention shown in FIGS. 1–4.

Turning to FIGS. 1–6, there is shown an exemplary embodiment of the oil pan containing a magnetic filter apparatus of the invention generally designated by reference numeral 10. In its preferred form, oil pan containing a magnetic filter apparatus 10 includes An oil pan containing a magnetic filter apparatus 10 includes an oil pan member 12 which includes a magnet assembly reception channel 14. A magnetic filter assembly 16 is received in the magnet assembly reception channel 14, and attachment means are provided for attaching the magnetic filter assembly 16 to the oil pan member 12. An oil flow director assembly 18 is connected to an oil pump intake tube 20 of an oil pump 19 for directing oil flow to a high magnetic flux region of the magnetic filter assembly 16. The magnetic filter assembly 16 separates ferro-magnetic particles from oil in the oil pan member 12 and traps the separated particles on the magnetic filter assembly 16.

The magnetic filter assembly 16 includes a magnet support member which is attachable to the attachment means. A magnet unit 24 is supported by the magnet support member. The magnet unit 24 provides a high magnetic flux region to circulating oil in the vicinity of an oil pump intake tube 20 for trapping metal particles on the magnetic filter assembly 16. The magnet unit 24 can be a magnet unit such as disclosed in U.S. Pat. No. 5,510,024, which patent and the disclosure therein is hereby incorporated herein by reference. The magnetic filter assembly 16 includes handle portions 17 which can be grasped for turning the magnetic filter assembly 16.

The magnet support member includes a support connector portion 22 for connecting to the attachment means. A support riser portion 26 is connected to the support connector portion 22, and a magnet holding member 28 is connected to the support riser portion 26. The support connector portion 22 includes external threads for engaging complimentary internal threads of the attachment means.

The attachment means includes a sealing ring 36 placed on an inside surface of the oil pan member 12 encompassing the magnet assembly reception channel 14. A second attachment ring 34 is placed on top of the sealing ring 36. A first attachment ring 32 is placed on an outside surface of the oil pan member 12 encompassing the magnet assembly reception channel 14. Fasteners 42 connect the first attachment ring 32 to the second attachment ring 34, with the sealing ring 36 and a portion of the oil pan member 12 sandwiched therebetween.

To implement the oil pan containing a magnetic filter apparatus 10 of the invention, either a conventional oil pan member 12 is obtained and a magnet assembly reception channel 14 is established therein, or an oil pan member 12 already containing a magnet assembly reception channel 14 is provided.

With the oil pan member 12 removed from the motor vehicle, an intake pipe extension tube 44 is slipped over the end of the oil pump intake pipe 20. Then, the flow directing funnel 48 is obtained, and the top funnel portion 50 is slipped over the bottom portion of the intake pipe extension tube 44. A ring fastener 46 is tightened so that the top funnel portion 50 can be slid on the intake pipe extension tube 44 but can be retained in position by friction, and so that the intake pipe extension tube 44 can be slid on the oil pump intake pipe 20 and can also be retained in position by friction.

Then, attention is turned to the oil pan member 12. The sealing ring 36 is placed on the inside surface of the bottom of the oil pan member 12 so that the magnet assembly reception channel 14 is encompassed by the sealing ring 36. The second attachment ring 34 is placed on top of the sealing ring 36, with the second attachment ring 34 also encompassing the magnet assembly reception channel 14. Then, the first attachment ring 32 is placed on the outer side of the oil pan member 12 encompassing the magnet assembly reception channel 14. Fastener reception channels in the second attachment ring 34, the sealing ring 36, the oil pan member 12, and the first attachment ring 32 are placed in registration, and portions of fasteners 42, e. g. bolts, are placed in those fastener reception channels. Then, the fasteners 42 are tightened to provide an oil-tight seal between the second attachment ring 34, the sealing ring 36, the oil pan member 12, and the first attachment ring 32.

Then, the oil pan member 12 is temporarily placed in position on the motor vehicle. When this is done, the top of the second attachment ring 34 pushes up on the bottom of the bottom funnel portion 52 causing the top funnel portion 50 to ride up on the intake pipe extension tube 44. Then, the magnetic filter assembly 16, which has externally threaded portion 22, is screwed into the magnet assembly reception channel 14 and into the second attachment ring 34 which has a complimentary internally threaded portion 30. When this is done, the sealing ring 40 in the sealing flange 38 presses up against the bottom of the oil pan member 12 providing an oil-tight seal. Also, when this is done, the magnet holding member 28 pushes up on the bottom of the intake pipe extension tube 44, and the intake pipe extension tube 44 rides up on the oil pump intake pipe 20. Once this has been done, the oil pan member 12 is removed from the motor vehicle, and the ring fastener 46 is tightened fully so that the intake pipe extension tube 44 and the top funnel portion 50 are securely attached to the oil pump intake pipe 20 in their adjusted positions. Then, the oil pan member 12 is attached once again to the motor vehicle, and the oil pan containing a magnetic filter apparatus 10 is ready for use.

Alternatively, the proper positioning of the intake pipe extension tube 44 and the top funnel portion 50 on the oil pump intake pipe 20 can be obtained by first making appropriate measurements between the bottom of the oil pump intake pipe 20 and the top of the magnet holding member 28 and between the bottom of the oil pump intake pipe 20 and the top of the second attachment ring 34. Then, the intake pipe extension tube 44 and the oil flow director assembly 18 are positioned on the oil pump intake pipe 20 to conform to those measurements. Then, the ring fastener 46 is fully tightened to secure the intake pipe extension tube 44 and the oil flow director assembly 18 in their adjusted positions.

Then, oil is added to the crankcase of the motor vehicle, and oil enters the oil pan member 12 which has been attached to the motor vehicle using an oil-tight seal. When the engine of the motor vehicle is operating, the oil pump 19 sucks oil up the oil pump intake pipe 20 and out from the oil pump output pipe 21 to lubricate the engine. For oil to reach the oil pump intake pipe 20 from the oil pan member 12, oil follows the pathway shown by arrows 27 in FIG. 4. More specifically, oil is sucked from the interior of the oil pan member 12, through the side ports 53 of the bottom tunnel portion 52, around the support riser portion 26 of the magnetic filter assembly 16, across the top of magnet holding member 28, through the side ports 45 of the intake pipe extension tube 44 and into the oil pump intake pipe 20. The region above the magnet holding member 28 in the vicinity of the side ports 45 of the intake pipe extension tube 44 is a high magnetic flux region due to the presence of the magnet unit 24 attached to the bottom side of the magnet holding member 28. Consequently, when oil from the interior of the oil pan passes across the top of the magnet holding member 28 and through the side ports 45 of the intake pipe extension tube 44, that oil is subjected to high magnetic flux. As a result, ferro-magnetic particles in that high magnetic flux region are attracted to the magnet unit 24, and those particles are separated from the flowing oil and are retained on the top of the magnet holding member 28. The magnet holding member 28 can also include an upwardly extending lip 29 to facilitate trapping of separated particles on the top of the magnet holding member 28.

To service the oil pan containing a magnetic filter apparatus 10 of the invention, after oil is drained from the oil pan member 12 from a conventional drain plug 23, the magnetic filter assembly 16 can be unscrewed from the second attachment ring 34 and the oil pan member 12. Then, the top of the magnet holding member 28 can be cleaned to remove any particles that are adhering thereto. Then, the cleaned magnetic filter assembly 16 can be screwed back into the oil pan member 12 and the second attachment ring 34, and an oil-tight seal is re-established between the sealing flange 38 of the magnetic filter assembly 16 and the oil pan member 12 using the sealing ring 40.

The components of the oil pan containing a magnetic filter apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved oil pan containing a magnetic filter apparatus that is low in cost, relatively simple in design and operation, and which may advantageously be used to magnetically treat circulating oil in the vicinity of the oil intake pipe of the oil pump. With the invention, an oil pan containing a magnetic filter apparatus provides an element which directs the flow of oil to a prepositioned gap between an oil intake pipe and a magnetic assembly. With the invention, an oil pan containing a magnetic filter apparatus is provided which combines an oil pan with a magnet assembly that is positioned near the oil intake pipe. With the invention, an oil pan containing a magnetic filter apparatus provides a magnet assembly that can easily be removed from the oil pan for cleaning and replaced in the oil pan after being cleaned.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. An oil pan containing a magnetic filter apparatus, comprising:

an oil pan member which includes a magnet assembly reception channel, a magnetic filter assembly received in said magnet assembly reception channel, and attachment means for attaching said magnetic filter assembly to said oil pan member, wherein said magnetic filter assembly includes:

a magnet support member attachable to said attachment means, and a magnet unit supported by said magnet support member, wherein said magnet unit provides a magnetic flux region to circulating oil in the vicinity of an oil pump intake tube, wherein said magnet support member includes:

a support connector portion for connecting to said attachment means, a support riser portion connected to said support connector portion, and a magnet holding member connected to said support riser portion, said, wherein said magnet holding member defines a wall having an exterior surface with respect to said oil pan and an opposed interior surface with respect to said oil pan, and wherein said magnet unit is supported on said exterior surface of said wall such that magnetically attractable particles in oil in said oil pan are adapted to be adhered to said interior surface of said wall without contacting said magnet unit.

2. The apparatus of claim 1, further including:

an oil flow director assembly, connected to an oil pump intake tube of an oil pump, for directing oil flow to a magnetic flux region of said magnetic filter assembly.

3. The apparatus of claim 1 wherein said support connector portion includes external threads for engaging complimentary internal threads of said attachment means.

4. The apparatus of claim 1 wherein said attachment means includes:

a sealing ring placed on an inside surface of said oil pan member encompassing said magnet assembly reception channel, a second attachment ring placed on top of said sealing ring, a first attachment ring placed on an outside surface of said oil pan member encompassing said magnet assembly reception channel, and fasteners which connect said first attachment ring to said second attachment ring with said sealing ring and a portion of said oil pan member sandwiched therebetween.

5. The apparatus of claim 1 wherein said magnetic filter assembly includes handle portions which can be grasped for turning said magnetic filter assembly.

* * * * *